United States Patent
Fujiwara et al.

(10) Patent No.: US 11,733,032 B2
(45) Date of Patent: Aug. 22, 2023

(54) MEASUREMENT DEVICE AND MEASUREMENT METHOD

(71) Applicant: Panasonic Intellectual Property Management Co., Ltd., Osaka (JP)

(72) Inventors: Hikaru Fujiwara, Osaka (JP); Ken Hatsuda, Kyoto (JP); Shota Tezuka, Kyoto (JP); Miyu Ueda, Osaka (JP); Takuya Yasunaga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 337 days.

(21) Appl. No.: 17/210,906

(22) Filed: Mar. 24, 2021

(65) Prior Publication Data

US 2021/0207952 A1    Jul. 8, 2021

Related U.S. Application Data

(63) Continuation of application No. PCT/JP2019/037621, filed on Sep. 25, 2019.

(30) Foreign Application Priority Data

Sep. 28, 2018    (JP) ................. 2018-185193

(51) Int. Cl.
*G01B 11/22* (2006.01)
*H04N 13/128* (2018.01)
(Continued)

(52) U.S. Cl.
CPC .............. *G01B 11/22* (2013.01); *G01B 11/02* (2013.01); *G01B 11/24* (2013.01); *H04N 13/128* (2018.05);
(Continued)

(58) Field of Classification Search
CPC ......... G01B 11/02; G01B 11/22; G01B 11/24; G01B 11/024; G06T 7/62;
(Continued)

(56) References Cited

U.S. PATENT DOCUMENTS

2009/0128648 A1    5/2009  Ikeda
2012/0320086 A1    12/2012 Kasama
(Continued)

FOREIGN PATENT DOCUMENTS

CN    101010559 A    8/2007
CN    103617002 A    3/2014
(Continued)

OTHER PUBLICATIONS

International Search Report for related Application No. PCT/JP2019/037621, dated Nov. 5, 2019.
(Continued)

*Primary Examiner* — Tri T Ton
(74) *Attorney, Agent, or Firm* — Renner, Otto, Boisselle & Sklar, LLP (57) ABSTRACT

A measurement device includes: an operation unit that receives an operation of a user; an acquisition unit that acquires depth information indicating a depth image and color information indicating a color image of an object; a controller that calculates, based on at least one of the depth information and the color information, first dimension of the object; and a display unit that displays a frame image showing a contour shape of the object to be superimposed on the color image, the contour shape being based on the first dimension. The operation unit receives a selection and an input of a change amount of the adjustment target plane by the user. The controller calculates, second dimension of the object when the adjustment target plane is moved in a normal direction based on the change amount, and changes the frame image to show a contour shape based on the second dimension.

7 Claims, 11 Drawing Sheets

(51) Int. Cl.
*G01B 11/02* (2006.01)
*G01B 11/24* (2006.01)
*H04N 13/00* (2018.01)

(52) U.S. Cl.
CPC .... *G01B 11/024* (2013.01); *H04N 2013/0081* (2013.01)

(58) Field of Classification Search
CPC ........... G06T 2207/10024; G06T 2207/10028; H04N 13/128; H04N 2013/0081; H04N 13/254; H04N 13/271
USPC .................................................. 356/600–640
See application file for complete search history.

(56) References Cited

U.S. PATENT DOCUMENTS

| | | |
|---|---|---|
| 2014/0184810 A1 | 7/2014 | Sekiguchi |
| 2014/0294308 A1 | 10/2014 | Nagaoka |
| 2015/0029190 A1* | 1/2015 | Ishida ..................... G01J 3/443 345/420 |
| 2015/0187091 A1 | 7/2015 | Hata |
| 2016/0299632 A1 | 10/2016 | Liu et al. |
| 2017/0251143 A1 | 8/2017 | Peruch |
| 2019/0011805 A1 | 1/2019 | Ota |

FOREIGN PATENT DOCUMENTS

| | | |
|---|---|---|
| JP | 2013-002959 A | 1/2013 |
| JP | 2014-089697 A | 5/2014 |
| JP | 2014-127945 A | 7/2014 |
| JP | 2014-209326 A | 11/2014 |
| JP | 2017-175606 A | 9/2017 |
| WO | 2006/135040 A1 | 12/2006 |
| WO | 2014/006832 A1 | 1/2014 |
| WO | 2017/151669 A1 | 9/2017 |

OTHER PUBLICATIONS

English Translation of Chinese Office Action dated Oct. 26, 2022 for the related Chinese Patent Application No. 201980061226.3.

* cited by examiner

MEASUREMENT DEVICE AND MEASUREMENT METHOD

BACKGROUND

1. Technical Field

The present disclosure relates to a measurement device and a measurement method which measure dimensions of an object.

2. Description of the Related Art

Patent Literature (PTL) 1 discloses an information processing apparatus that superimposes and displays a visible light image and a thermal image. This information processing apparatus makes a display format of a specific portion in the thermal image different from those of other portions, the specific portion being different in temperature from a surrounding thereof. For example, the thermal image is displayed such that the specific portion has a larger number of pixels or a higher transparency than the other portions. This makes it possible to clearly and easily recognize a temperature distribution in a specific portion of an object.

PTL 1 is Unexamined Japanese Patent Publication No. 2013-2959.

SUMMARY

The present disclosure provides a measurement device and a measurement method which enable adjustment of measured dimensions of an object.

The measurement device according to the present disclosure is a measurement device that calculates a size of an outer shape of an object that has a plurality of planes. The measurement device includes: an operation unit that receives an operation of a user; an acquisition unit that acquires depth information indicating a depth image of the object and color information indicating a color image of the object; a controller that calculates, based on at least one of the depth information and the color information, first dimension indicating a width, a depth, and a height of the object; and a display unit that displays a frame image showing a contour shape of the object to be superimposed on the color image, the contour shape being based on the first dimension. The operation unit receives the selection of the adjustment target plane and the input of the change amount of the adjustment target plane by the user. The controller calculates, based on the first dimension and the change amount, second dimension indicating a width, a depth, and a height of the object when the adjustment target plane is moved in a normal direction of the adjustment target plane based on the change amount, and changes the frame image displayed by the display unit to show a contour shape of the object, the contour shape being based on the second dimension.

These general and specific aspects may be achieved by a system, a method, and a computer program, and any combination of these.

The measurement method according to the present disclosure is a measurement method of calculating a size of an outer shape of an object that has a plurality of planes. The measurement method includes: a step of acquiring depth information indicating a depth image of the object and color information indicating a color image of the object; a step of calculating first dimension indicating a width, a depth, and a height of the object based on at least one of the depth information and the color information; a step of displaying a frame image showing a contour shape of the object to be superimposed on the color image, the contour shape being based on the first dimension; a step of receiving a selection of an adjustment target plane and an input of a change amount of the adjustment target plane by a user; a step of calculating, based on the first dimension and the change amount, second dimension indicating a width, a depth, and a height of the object when the adjustment target plane is moved in a normal direction of the adjustment target plane based the change amount; and a step of changing the frame image displayed on the display unit to show a contour shape of the object, the contour shape being based on the second dimension.

The measurement device and measurement method in the present disclosure calculate the dimensions of the object when the adjustment target plane selected by the user is moved in the normal direction of the adjustment target plane based on the change amount specified by the user. This makes it possible to adjust the measured dimensions of the object.

DETAILED DESCRIPTION

Exemplary embodiments will be described below in detail with appropriate reference to the drawings. However, detailed descriptions more than necessary may be omitted. For example, a detailed description of a matter which is already well-known, or a repetitive description for a substantially identical configuration may be omitted. Such omissions are made in order to avoid unnecessary redundancy of the following description and to facilitate the understanding of those skilled in the art. The inventors provide the accompanying drawings and the following description to help those skilled in the art sufficiently understand the present disclosure, and therefore have no intention to put any limitation by those drawings and description on subject matters described in claims.

(Knowledge Underlying the Present Disclosure)

In order to photograph the entire object to be measured, for example, the entire box-shaped load for use in logistics with a depth camera such as an infrared camera, it is necessary to photograph the load from a distance such that the entire load is reflected. However, for example, in the case of using an infrared active stereo method, it is difficult to detect a depth in a gap, an uneven portion, a black material, and the like, and missing of data is likely to occur in depth information. Moreover, infrared rays are also affected by sunlight. Therefore, when the photography is performed from a distant distance, noise may be included in the depth information obtained from the depth camera, or the missing of data may occur. That is, accuracy of the depth information decreases. Hence, in some cases, the measurement of the dimensions of the object based on the depth information has been poor in accuracy.

The measurement device of the present disclosure enables fine adjustment of dimensions of the object after the dimensions are measured. Specifically, the measurement device of the present disclosure superimposes and displays a color image and a frame image showing a contour shape of an object, which is based on dimensions calculated based on a depth image. The measurement device receives a user's selection of an adjustment target plane and a user's input of a change amount of the plane. The measurement device calculates dimensions of the object when the adjustment target plane selected by the user is moved in a normal direction of the adjustment target plane based on a change amount specified by a user. This enables the user to adjust the measured dimensions. The measurement device of the present disclosure will be described below in detail.

Exemplary Embodiments

Exemplary embodiments will be described below with reference to the drawings.

1. Configuration of Measurement Device

A configuration of a measurement device of the present exemplary embodiment will be described with reference to FIGS. 1 to 4.

Figure 1:
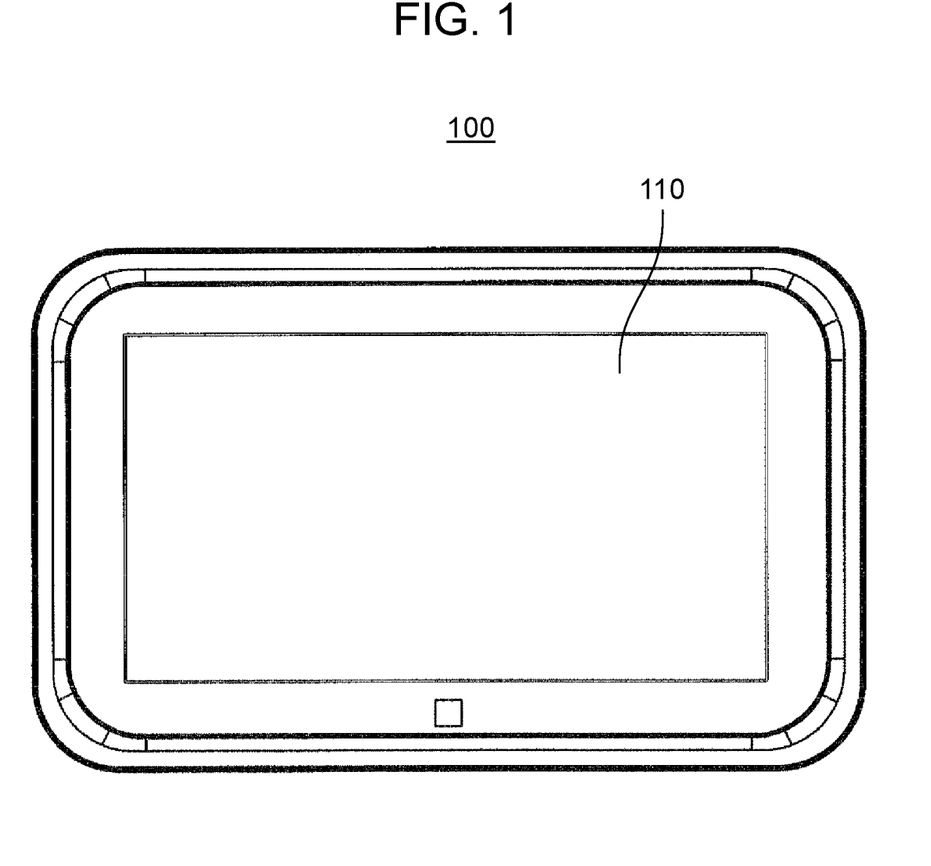
FIG. 1 is a front view of a measurement device.
Figure 2:
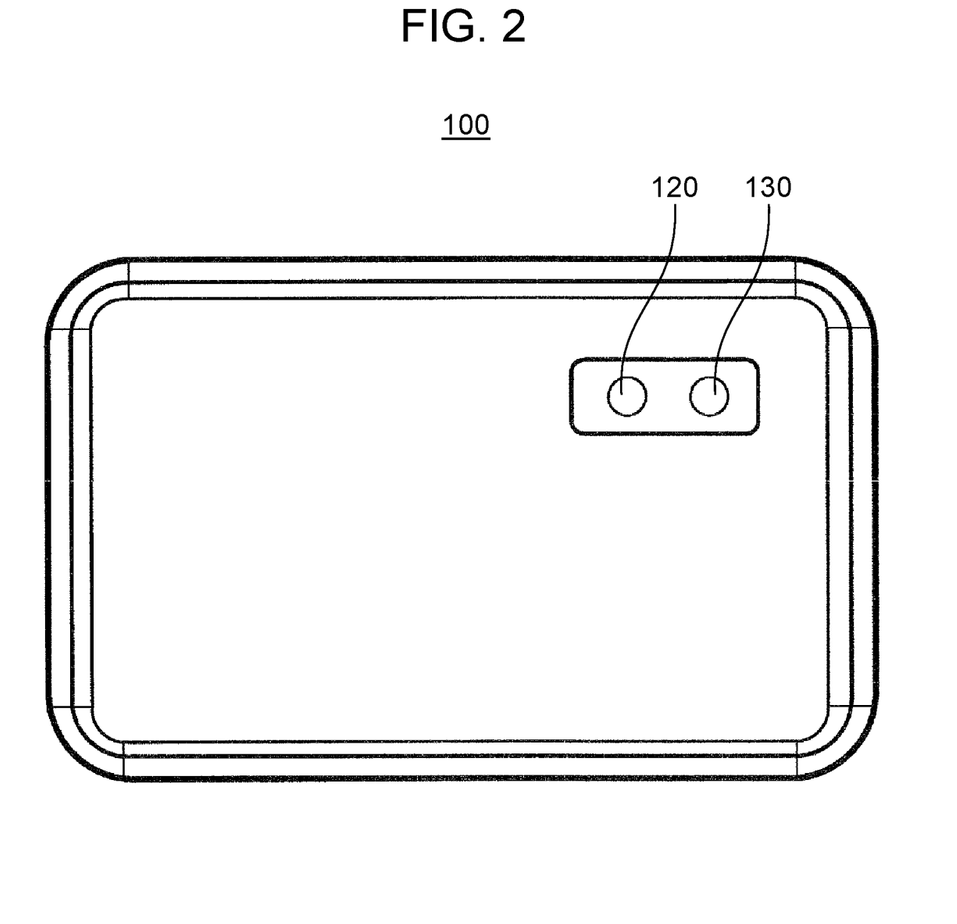
FIG. 2 is a back view of the measurement device.

FIG. 1 is a front view of the measurement device according to the present exemplary embodiment. FIG. 2 is a back view of the measurement device according to the present exemplary embodiment. Measurement device 100 is, for example, a tablet-type personal computer. Measurement device 100 includes touch screen 110 on a front side thereof, and includes depth camera 120 and visible light camera 130 on a back side thereof.

Figure 3:
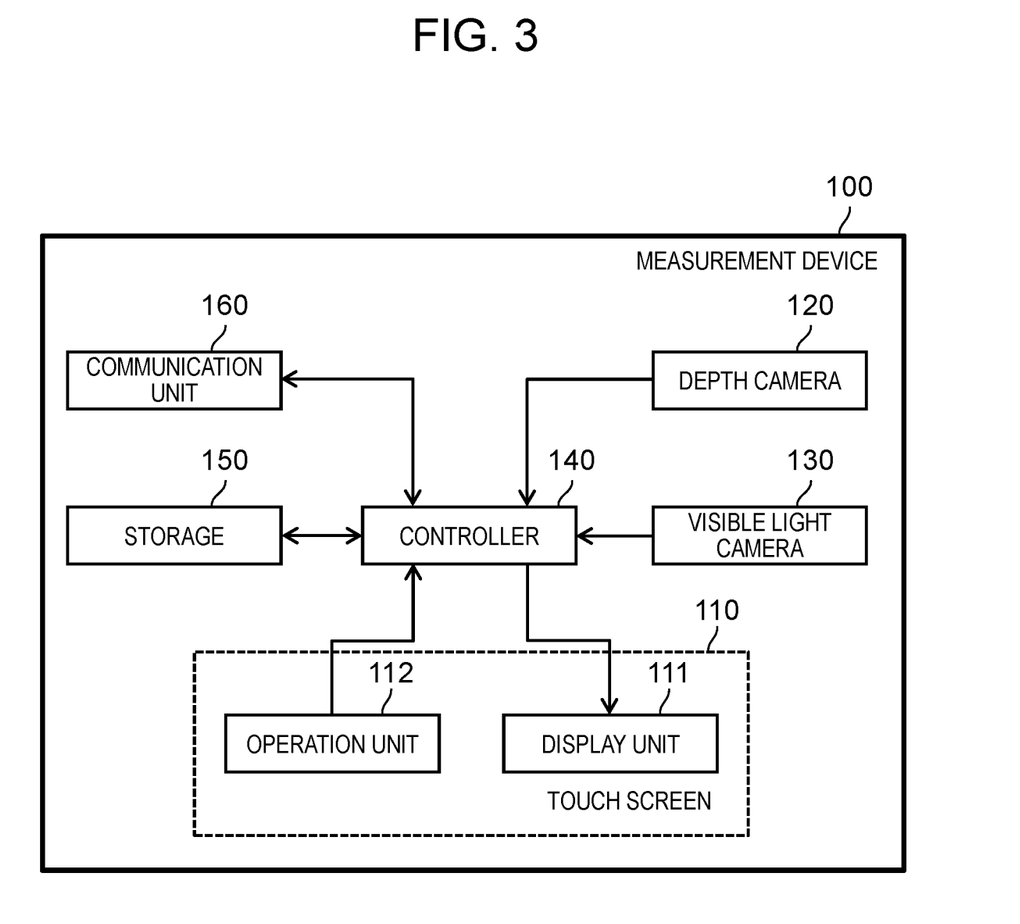
FIG. 3 is a block diagram illustrating an electrical configuration of the measurement device.

FIG. 3 is a block diagram illustrating an electrical configuration of the measurement device according to the first exemplary embodiment. Measurement device 100 includes controller 140, storage 150, and communication unit 160 in addition to touch screen 110, depth camera 120, and visible light camera 130.

Touch screen 110 includes display unit 111 and operation unit 112. Display unit 111 is configured with, for example, a liquid crystal display or an organic electroluminescence (EL) display. Operation unit 112 is a user interface that receives a variety of operations by a user. In the present exemplary embodiment, operation unit 112 is a touch panel provided on the surface of display unit 111. Operation unit 112 detects a touch operation by a user's finger or a pointing device such as a pen. Operation unit 112 includes, for example, an electrode film. For example, controller 140 measures a change in voltage or a change in electrostatic capacity, which is caused by the fact that the finger or the pointing device comes into contact with operation unit 112, and can thereby specify a contact position of the finger or the pointing device. Note that operation unit 112 may be configured with a keyboard, buttons, switches, or any combination of these as well as the touch panel.

Depth camera 120 generates depth information indicating a distance from a reference position to a subject. Specifically, depth camera 120 measures the distance to the subject, and generates a depth image in which the measured distance is indicated by a depth value for each pixel. Each pixel in the depth image is specified by two-dimensional coordinates. Depth camera 120 is, for example, an infrared camera. Depth camera 120 is configured by implementing various known techniques such as an active stereo system and a time of flight (TOF) system. For example, measurement device 100 may include two depth cameras 120, in which case the distance may be calculated based on a parallax of two images. Measurement device 100 may include one depth camera 120, in which case the distance may be calculated from a time taken for emitted infrared rays to hit an object and for the reflected light to return. Depth camera 120 corresponds to an acquisition unit that acquires depth information.

Visible light camera 130 photographs a subject and generates color information. Visible light camera 130 includes an image sensor such as a CCD image sensor, a CMOS image sensor, and an NMOS image sensor. The color information is, for example, a color image showing an RGB value for each pixel. Each pixel in the color image is specified by two-dimensional coordinates. Visible light camera 130 corresponds to an acquisition unit that acquires color information.

Controller 140 is configurable with a semiconductor element or the like. Controller 140 can be configured with, for example, a microcomputer, a central processing unit (CPU), a micro processing unit (MPU), a graphics processing unit (GPU), a digital signal processor (DSP), a field programmable gate array (FPGA), or an application specific integrated circuit (ASIC). Functions of controller 140 may be implemented only by hardware or may be implemented by a combination of hardware and software. Controller 140 reads out data and programs stored in storage 150 to perform various arithmetic processing, and thus implements predetermined functions.

Storage 150 is a storage medium that stores a program and data necessary to achieve functions of measurement device 100. Storage 150 can be configured with, for example, a hard disk (HDD), a solid state drive (SSD), a random access memory (RAM), a dynamic RAM (DRAM), a ferroelectric memory, a flash memory, a magnetic disk, or any combination of these.

Communication unit 160 includes a circuit that communicates with an external device in accordance with a predetermined communication standard. The predetermined communication standard is, for example, a local area network (LAN), Wi-Fi (registered trademark), Bluetooth (registered trademark), a universal serial bus (USB), and HDMI (registered trademark).

Figure 4:
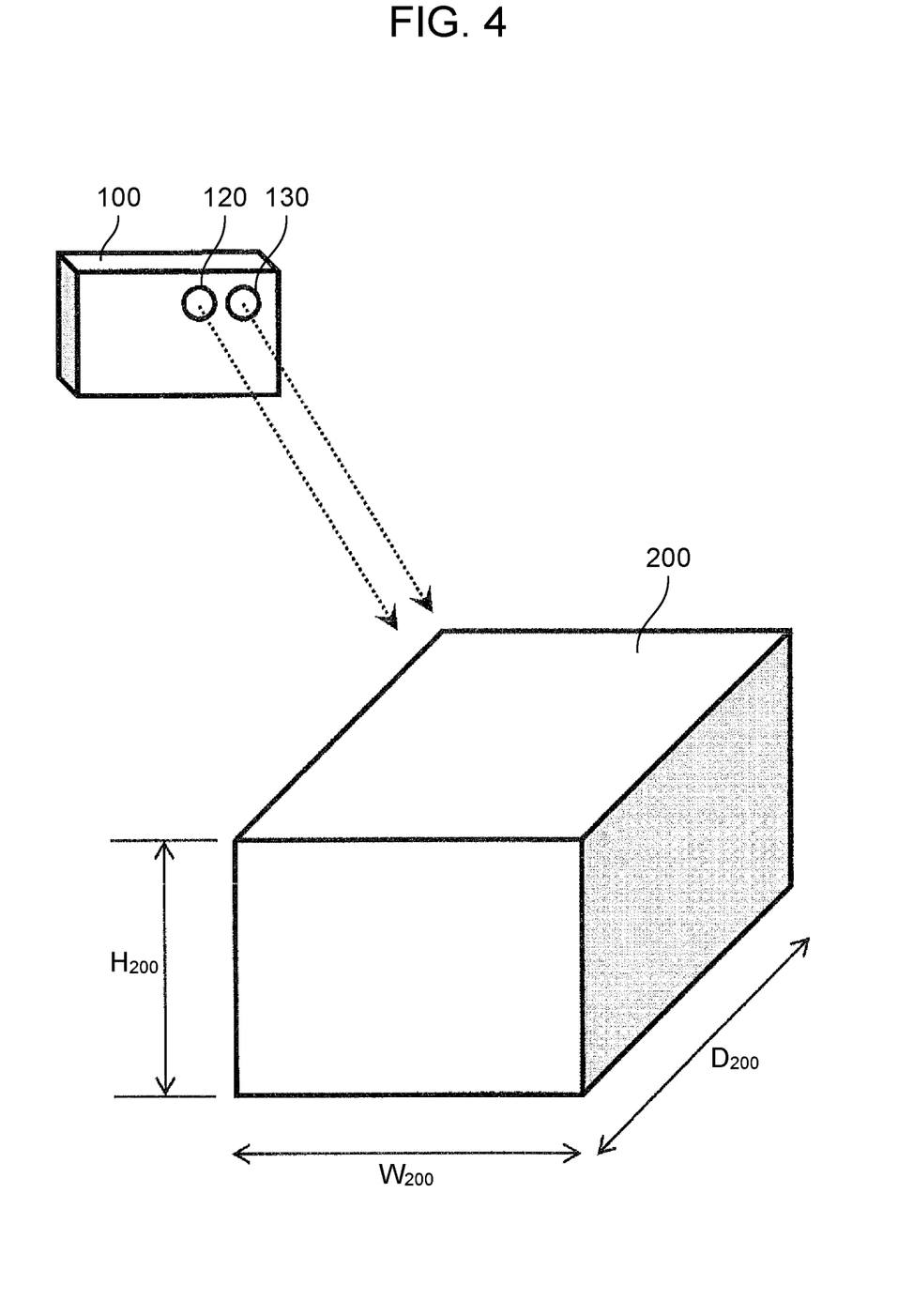
FIG. 4 is a diagram for explaining photography of an object by the measurement device.

FIG. 4 schematically illustrates photography of object 200 by measurement device 100. Object 200 to be measured by measurement device 100 is, for example, a box-shaped load for use in logistics. Object 200 includes a plurality of planes. In the example of FIG. 4, object 200 includes six planes since object 200 is a rectangular parallelepiped box. Depth camera 120 measures a distance from depth camera 120 to object 200 with a position of depth camera 120 taken as a reference position, and generates a depth image. Visible light camera 130 photographs object 200 and generates a color image. Since the purpose of the present exemplary embodiment is to measure object 200, object 200 is photographed so that at least two planes thereof are reflected as illustrated in FIG. 4. Measurement device 100 calculates width W200, depth D200, and height H200 of object 200 with reference to the depth image and the color image.

In the present exemplary embodiment, in FIGS. 2 to 4, the case where depth camera 120 and visible light camera 130 are separate cameras is illustrated. However, depth camera 120 and visible light camera 130 may be one camera capable of acquiring both the depth information and the color information.

2. Operation of Measurement Device

An operation of measurement device 100 of the present exemplary embodiment will be described with reference to FIGS. 5 to 11.

2.1 Overall Flow

Figure 5:
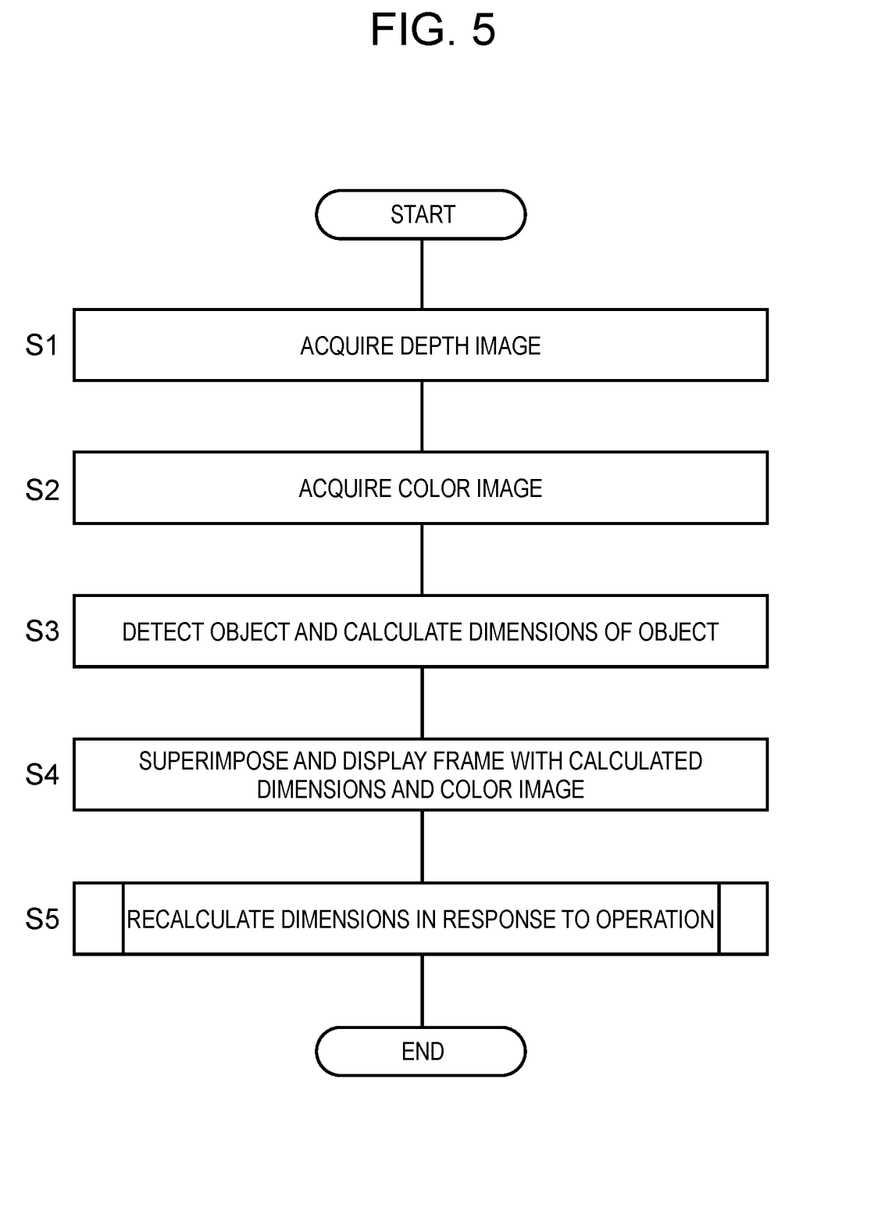
FIG. 5 is a flowchart illustrating an overall operation of the measurement device.

FIG. 5 illustrates an operation of controller 140 of measurement device 100. Controller 140 acquires, from depth camera 120, the depth information indicating the depth image (Step S1). Controller 140 acquires, from visible light camera 130, the color information indicating the color image (Step S2).

Controller 140 detects object 200 based on the depth image, and calculates the dimensions of object 200 (Step S3). Controller 140 may extract a contour of object 200 by performing image processing for the color image, and may detect object 200. Controller 140 may detect object 200 based on both the color image and the depth image. The detection of object 200, which is based on the depth image and/or the color image, can be performed by the existing known technique. The detection of object 200 specifies a position of object 200 in the image.

Controller 140 superimposes the color image and an image of a frame having a size of the calculated dimensions, that is, a frame image showing a contour shape of each plane of object 200 on each other, and displays the superimposed color image and frame image on display unit 111 (Step S4). When depth camera 120 and visible light camera 130 are the same camera, the two-dimensional coordinates of the depth image and the two-dimensional coordinates of the color image coincide with each other. When depth camera 120 and visible light camera 130 are separate cameras, for example, controller 140 associates the two-dimensional coordinates of the depth image and the two-dimensional coordinates of the color image with each other based on positions of depth camera 120 and visible light camera 130. For example, controller 140 converts a coordinate system of the depth image and a coordinate system of the color image into a coordinate system with a predetermined reference position taken as an origin.

Controller 140 recalculates the dimensions of object 200 in response to a user's operation (Step S5).

Figure 6:
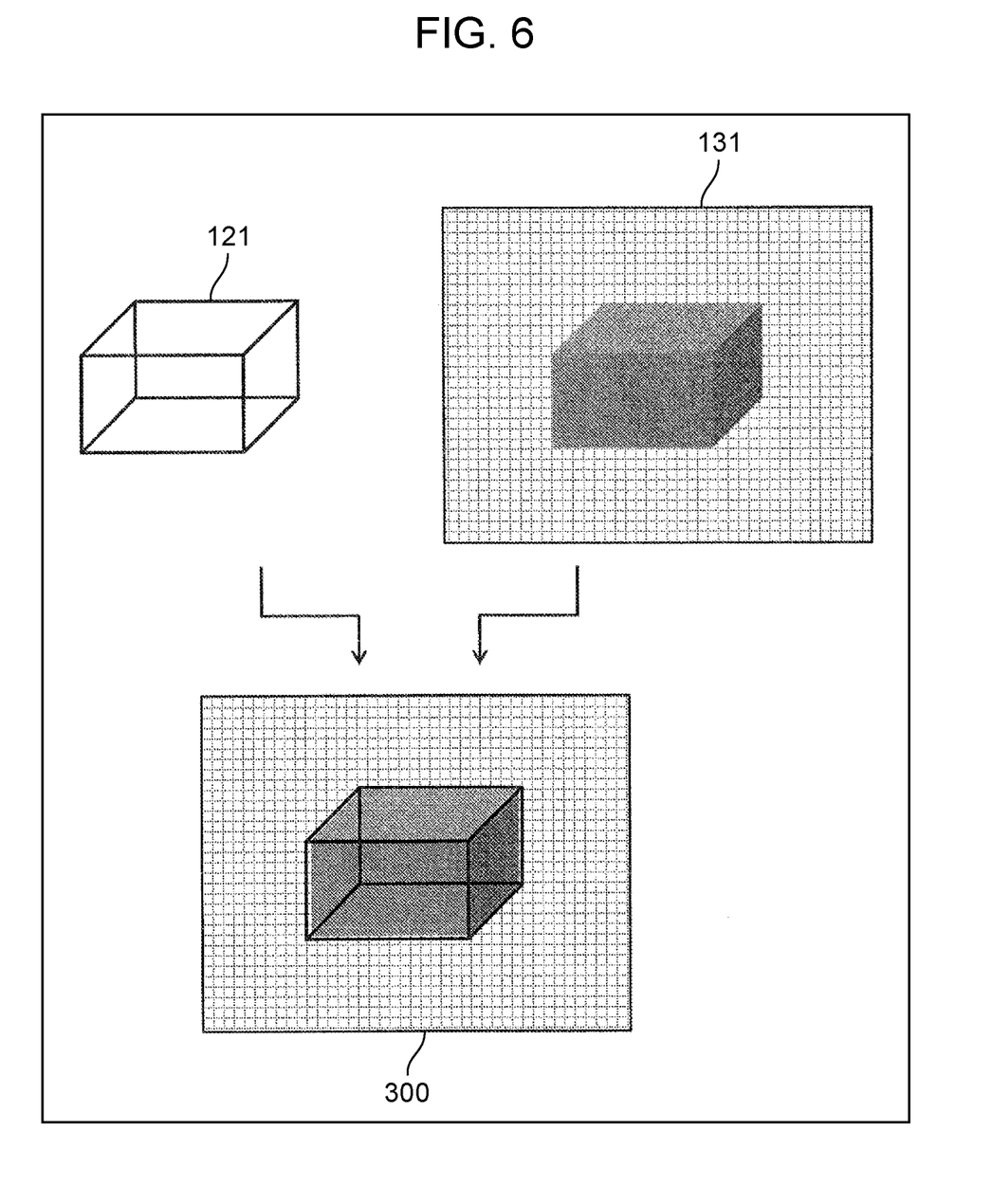
FIG. 6 is a diagram illustrating an example in which a frame image showing a contour shape of an estimated object and a visible light image are superimposed and displayed.

FIG. 6 exemplifies the superimposition of Step S4, that is, superimposition of color image 131 acquired in Step S2 and the image (frame image) of frame 121 having the dimensions calculated in Step S3. Controller 140 generates superimposed image 300 in which the image of frame 121 showing the contour shape of each plane of object 200 is superimposed on color image 131.

Figure 7:
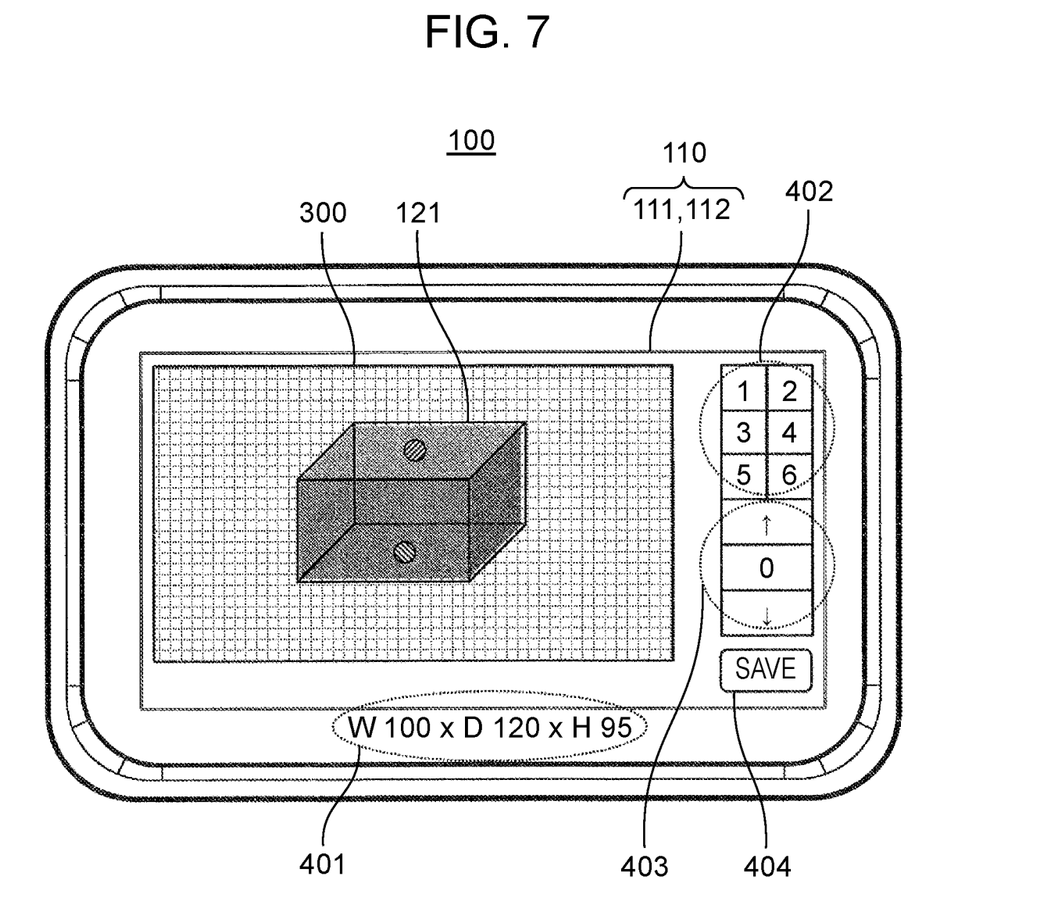
FIG. 7 is a diagram illustrating an example of a screen for adjusting a measurement result.

FIG. 7 illustrates an example of the screen of display unit 111 in Step S5, the screen serving for adjusting a measurement result. Display unit 111 displays superimposed image 300 generated in Step S4 and dimensions 401 calculated in Step S3. Moreover, display unit 111 displays plane selection button 402 for selecting a plane of which dimensions are to be adjusted, adjustment button 403 for changing the size of frame 121, and save button 404 for determining the dimensions.

Plane selection button 402 includes, for example, numeric buttons from "1" to "6" such that any of the six planes of the rectangular parallelepiped can be selected. For example, the numeric values "1" to "6" correspond to planes P1 to P6 illustrated in part (a) of FIG. 9, respectively. Adjustment button 403 includes, for example, a button for increasing the change amount and a button for reducing the change amount. Each of the numeric values set by adjustment button 403 corresponds to a number of pixels. The user performs the touch operation on adjustment button 403, and can thereby input, to measurement device 100, a numeric value indicating the change amount.

The user performs the touch operation for the inside of superimposed image 300 or for plane selection button 402 by the finger or the pointing device, and can thereby select the plane of which dimensions are to be adjusted. The user performs a slide operation for the selected screen in superimposed image 300 or the touch operation for adjustment button 403, and can thereby move the selected plane, that is, a part of frame 121 in a normal direction of that plane. Thus, the user can change the size of frame 121. In the selection processing for the plane and the changing processing for the size, any combination of the button operation and the operation on the image is possible. For example, the user may select a plane by the touch operation on superimposed image 300, and may perform the slide operation from a touched position to move the plane. The user may move the plane, which is selected by operating plane selection button 402, by operating adjustment button 403. The user may perform either the selection processing for the plane and the changing processing for the size by the operation on superimposed image 300, and may perform the other processing by the operation for the button. For example, the user may move the plane, which is selected by operating plane selection button 402, by performing the slide operation on superimposed image 300. The user may move the plane, which is selected by the touch operation on superimposed image 300, by operating adjustment button 403.

2.2 Recalculation of Dimensions

Figure 8:
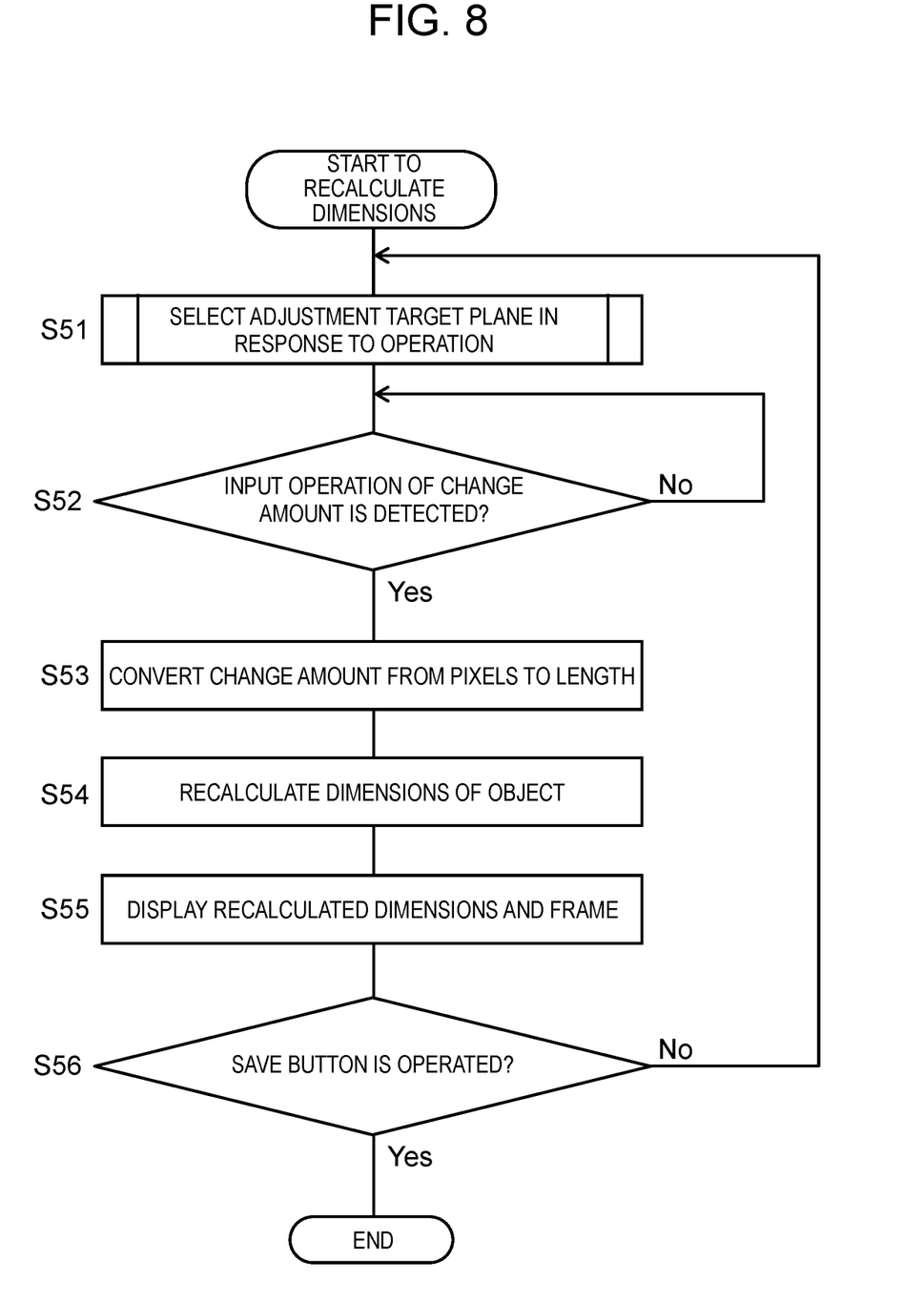
FIG. 8 is a flowchart illustrating an operation of dimension recalculation.
Figure 9:
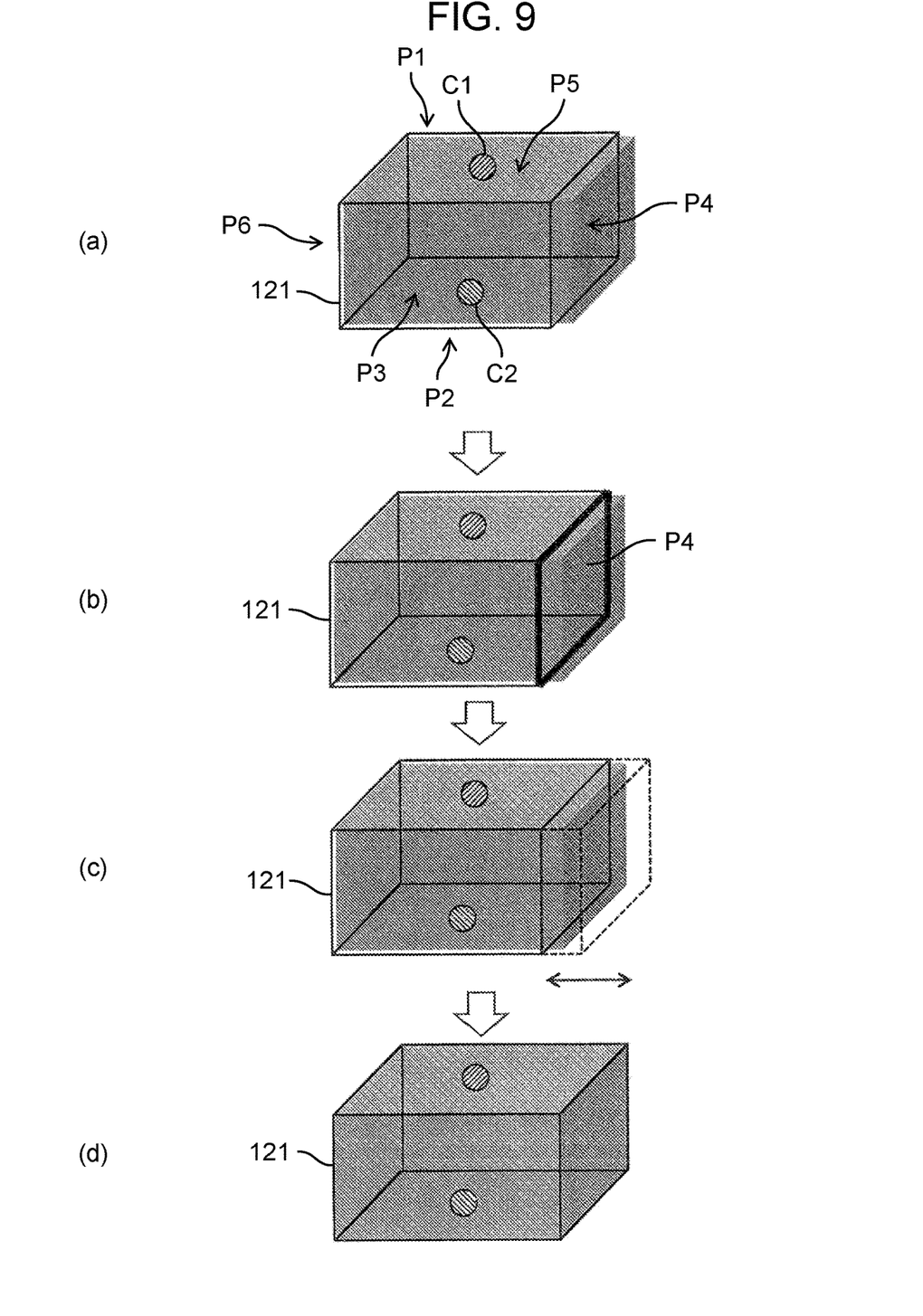
FIG. 9 is a diagram for explaining a slide operation in a normal direction.

FIG. 8 illustrates details of recalculation of the dimensions (Step S5) corresponding to the user's operation. FIG. 9 exemplifies the slide operation.

Controller 140 selects the adjustment target plane in response to the user's operation (Step S51). For example, the user performs the touch operation for the inside of superimposed image 300 or plane selection button 402, which is illustrated in FIG. 7, by the finger or the pointing device. Controller 140 selects the adjustment target plane from among six planes P1 to P6 based on coordinates of the contact position of the finger or the pointing device. Part (b) of FIG. 9 illustrates an example in which plane P4 is selected as the adjustment target plane.

Controller 140 determines whether or not to have detected the user's input operation of the change amount (Step S52). Controller 140 detects the slide operation by detecting, for example, a change in the coordinates of the contact position of the finger or the pointing device. For example, upon detecting the slide operation, controller 140 determines that the input operation of the change amount has been performed. Moreover, upon detecting that the adjustment button 403 has been operated based on the coordinates of the contact position of the finger or the pointing device, controller 140 determines that the input operation of the change amount has been performed. Note that the input operation of the change amount may be an operation of directly inputting a numeric value using a keyboard or the like.

When the input operation of the change amount is performed, controller 140 converts the change amount from pixels to a length (Step S53). For example, when the input operation of the change amount is the slide operation, controller 140 converts a number of pixels, which corresponds to the slide amount, into a length (for example, mm). When the input operation of the change amount is the touch operation for the adjustment button 403, controller 140 converts the numeric value set by the adjustment button 403 into the length.

Controller 140 recalculates the dimensions of object 200 in response to the converted length (Step S54). Specifically, controller 140 recalculates the dimensions of object 200 based on the dimensions calculated in Step S3 and the converted length. Here, as illustrated in part (c) of FIG. 9, controller 140 limits the moving direction of the adjustment target plane to the normal direction of the adjustment target plane. Hence, controller 140 recalculates the width, the depth, and the height dimensions of object 200 when the adjustment target plane is increased or reduced with respect to the normal direction of the plane in response to the converted length.

Controller 140 displays, on display unit 111, the recalculated dimensions and the image of frame 121 having the size of those dimensions (Step S55). That is, controller 140 changes the size of frame 121, which is to be displayed on display unit 111, from the dimensions calculated in Step S3 to the dimensions calculated in Step S54.

Controller 140 determines whether or not save button 404 has been operated (Step S56). Upon detecting that save button 404 has been operated, for example, controller 140 stores, in storage 150, the dimensions recalculated in step S54, and ends the processing illustrated in FIG. 8. Until save button 404 is operated, the processing returns to Step S51, and the processing illustrated in FIG. 8 is repeated. At this time, for example, if the adjustment target plane is not newly selected in Step S51, Steps S52 to S55 are repeated for the current adjustment target plane.

Since frame 121 is displayed on the color image in a superimposed manner on display unit 111, the user can move adjustment target plane such that frame 121 coincides with the size of object 200 reflected in the color image. For example, the user selects a plane that deviates from the contour of object 200 (part (b) of FIG. 9), performs the slide operation for the selected plane (part (c) of FIG. 9), and thereby causes fame 121 to coincide with the contour of object 200 (part (d) of FIG. 9). Controller 140 recalculates the dimensions of object 200 based on the change amount, for example, the slide amount. Thus, for example, even if accuracy of the first dimension calculated based on the depth image is not good, the user changes the size of frame 121 while visually observing superimposed image 300, whereby controller 140 can calculate such dimensions which coincide with the actual size of object 200.

Controller 140 may cause a difference between display of the frame (for example, part (c) of FIG. 9) while the slide operation is being performed, that is, while the change in the coordinates of the contact position of the finger or the pointing device is being continuously detected and display of the frame (for example, part (d) of FIG. 9) after the slide operation is ended, that is, when non-contact is detected. For example, during the slide operation, such display may be made that the size of the frame before the start of the slide operation and the size of the frame, which corresponds to the slide amount, can be visually recognized individually.

2.3 Selection of Planes

In Step S51, when the user performs the touch operation for plane selection button 402, controller 140 selects the adjustment target plane from among six planes P1 to P6 based on the coordinates of the contact position of the finger or the pointing device and the coordinates of the numeric button included in plane selection button 402.

Figure 10:
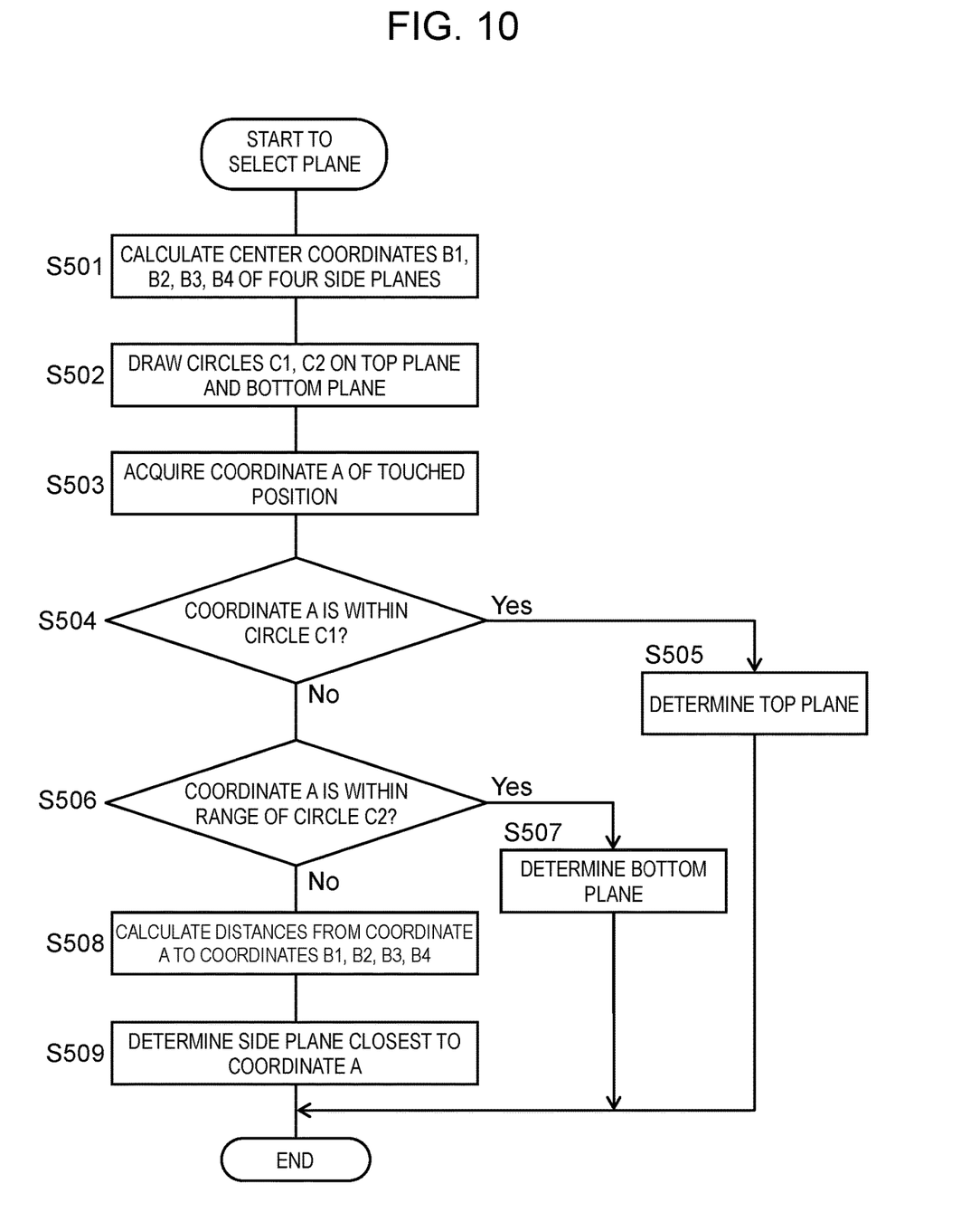
FIG. 10 is a flowchart illustrating an operation of selecting a plane of an object.

When the user performs the touch operation for superimposed image 300 in Step S51, controller 140 selects the adjustment target plane from six planes P1 to P6 by processing illustrated in FIG. 10.

Figure 11:
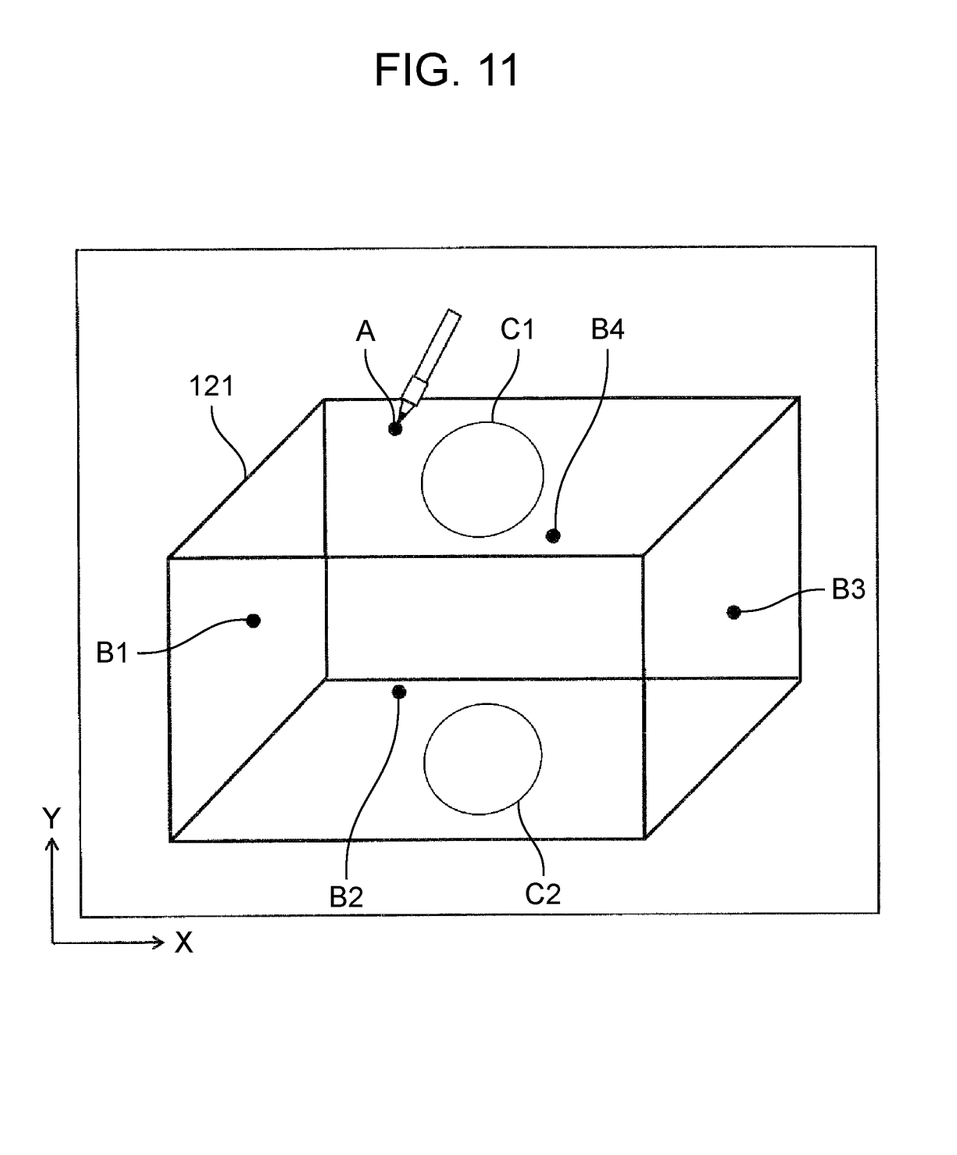
FIG. 11 is a diagram for explaining the operation of selecting the plane of the object.

FIG. 10 illustrates details of the selection of the adjustment target plane (Step S51) based on the touch operation in superimposed image 300. FIG. 11 illustrates coordinates A of a position touched by the user, center coordinates B1, B2, B3, B4 of side planes, circle C1 drawn on a part of a top plane, and circle C2 drawn on a part of a bottom plane. Controller 140 performs processing illustrated in FIG. 10 based on a camera coordinate system (two-dimensional coordinate system).

Controller 140 calculates center coordinates B1, B2, B3, B4 of the four side planes based on the dimensions of object 200, which are calculated in Step S3, that is, based on the size of frame 121 (Step S501). Controller 140 draws circles C1 and C2 on the top plane and bottom plane of frame 121, respectively (Step S502).

Controller 140 acquires coordinates A of a position touched by the user (S503). Controller 140 determines whether or not coordinates A are within a range of circle C1 (S504). If coordinates A are within the range of circle C1, controller 140 determines the top plane as the adjustment target plane (S505).

If coordinates A are not within the range of circle C1, controller 140 determines whether or not coordinates A are within a range of circle C2 (S506). If coordinates A are within the range of circle C2, controller 140 determines the bottom plane as the adjustment target plane (S507).

If coordinates A are not within the range of circle C2, controller 140 individually calculates a distance from coordinates A to center coordinates B1, a distance from coordinates A to center coordinates B2, a distance from coordinates A to center coordinates B3, and a distance from coordinates A to center coordinates B4 (S508). Controller 140 determines, as the adjustment target plane, a side plane corresponding to coordinates in which the distance is shortest among center coordinates B1 to B4 (S509).

3. Effects and Supplements

Measurement device 100 of the present exemplary embodiment calculates the size of the outer shape of object 200 having a plurality of planes. Measurement device 100 includes: operation unit 112 that receives a user's operation; an acquisition unit that acquires depth information indicating a depth image of an object and color information indicating a color image of the object; controller 140 that calculates, based on at least one of the depth information and the color information, first dimension indicating a width, a depth and a height of the object; and display unit 111 that superimposes, on the color image, a frame image showing a contour shape of the object, the contour shape being based on the first dimension, and displays the frame image and the color image. Operation unit 112 receives a user's selection of an adjustment target plane and a user's input of a change amount of the adjustment target plane. Controller 140 calculates, based on the first dimension and the change amount, second dimension of the object when the adjustment target plane is moved in a normal direction of the adjustment target plane based on the change amount, and changes the frame image displayed by display unit 111 such that the frame image shows a contour shape of the object, the contour shape being based on the second dimension.

This makes it possible to adjust the measured dimensions of the object. For example, the user selects a plane, which deviates from the contour of the object in the color image, from among a plurality of planes illustrated by frame 121. The user inputs the change amount, for example, by a slide operation. Based on the change amount input by the user, for example, the slide amount, controller 140 measures dimensions of object 200 when the adjustment target plane is moved in the normal direction thereof. Moreover, controller 140 changes the size of frame 121 such that frame 121 shows measured dimensions. Hence, the user moves the selected plane such that frame 121 coincides with the contour of object 200 in the color image, whereby controller 140 can accurately calculate the dimensions of object 200. Thus, for example, even if the depth information contains noise and the initially calculated dimensions have an error, controller 140 can accurately calculate the dimensions of object 200 based on the adjustment by the user's visual observation.

Operation unit 112 is a touch panel. Controller 140 calculates the center coordinates of each of the plurality of planes in the image of frame 121 in the user's selection of the adjustment target plane, and selects, as the adjustment target plane, a plane in which a distance between coordinates of a position of the touch panel, which is touched by the user, and the center coordinates is shortest.

Thus, the user can select a plane desired to be selected.

On at least one of the plurality of planes, display unit 111 displays an image with a predetermined shape associated with the plane. In the present exemplary embodiment, display unit 111 displays a circle. When the coordinated of the position of the touch panel, which is touched by the user, are within a range of an image with a predetermined shape in the user's selection of the adjustment target plane, controller 140 selects, as the adjustment target plane, a plane associated with the image with the predetermined shape.

Thus, the user can select a plane desired to be selected.

The change amount of the adjustment target plane is input by the slide operation for operation unit 112 or numeric input.

The change amount input by the user corresponds to the number of pixels. Controller 140 converts the number of pixels into a length and calculates the second dimension.

The acquisition unit includes: depth camera 120 that photographs the object and generates depth information; and visible light camera 130 that photographs the object and generates color information.

A measurement method of the present exemplary embodiment is a method in which a controller of a computer calculates the size of the outer shape of object 200 having a plurality of planes. The measurement method includes: Steps S1, S2 of acquiring depth information indicating a depth image of object 200 and color information indicating a color image of object 200 from an acquisition unit; Step S3 of calculating first dimension indicating a width, a depth, and a height of the object based on at least one of the depth information and the color information; Step S4 of superimposing, on the color image, a frame image showing a contour shape of the object, the contour shape being based on the first dimension, and displaying the color image and the frame image on display unit 111; Steps S51, S52 of receiving, via operation unit 112, a user's selection of an adjustment target plane and a user's input of a change amount of the selected adjustment target plane; Steps S53, S54 of calculating, based on the first dimension and the change amount, second dimension of the object when the selected adjustment plane is moved in a normal direction of the adjustment target plane based on the change amount; and Step S55 of changing the frame image displayed by display unit 111 such that the frame image shows a contour shape of the object, the contour shape being based on the second dimension.

This makes it possible to adjust the measured dimensions of the object.

Other Exemplary Embodiments

As above, the exemplary embodiment has been described as exemplification of the technique disclosed in the present application. However, the technique in the present disclosure is not limited to the exemplary embodiments and is applicable to exemplary embodiments appropriately subjected to changes, replacements, additions, omissions, and the like. Moreover, a new exemplary embodiment can be made by combining the respective constituent elements described in the above exemplary embodiment.

In the above exemplary embodiment, circles C1, C2 are drawn as shapes for specifying the top plane and the bottom plane, but the shape for specifying the plane does not have to be circular. For example, the shape may be a quadrangle. Moreover, the planes which can be specified by a figure do not have to be the top plane and the bottom plane. For example, the planes may be side planes.

In the above exemplary embodiment, depth camera 120 is built in measurement device 100, but depth camera 120 does not have to be built in measurement device 100. Measurement device 100 may acquire, via communication unit 160, the depth information generated by depth camera 120. In this case, communication unit 160 corresponds to the acquisition unit that acquires the depth information. Likewise, visible light camera 130 does not have to be built into measurement device 100. Measurement device 100 may acquire color information together with the depth information via communication unit 160. In this case, communication unit 160 corresponds to the acquisition unit that acquires the color information.

In the above exemplary embodiment, the user manually changes the size of frame 121 by visually observing superimposed image 300, whereby controller 140 recalculates the dimensions of object 200. Alternatively, the dimensions of object 200 may be calculated from superimposed image 300 using machine learning.

It is possible to achieve measurement device 100 of the present disclosure by cooperation with hardware resources such as a processor, a memory, and a program.

As above, the exemplary embodiments have been described as exemplifications of the technique in the present disclosure. For that purpose, the accompanying drawings and detailed descriptions have been provided. Hence, the constituent elements described in the accompanying drawings and the detailed description may include not only the constituent elements essential for solving the problem but also constituent elements that are not essential for solving the problem in order to illustrate the technique. Therefore, it should not be immediately recognized that such inessential constituent elements are essential by the fact that the inessential constituents are described in the accompanying drawings and the detailed description.

Moreover, since the above exemplary embodiments illustrate the technique in the present disclosure, various modifications, substitutions, additions, omissions and the like can be performed within the scope of claims and equivalent scope of claims.

INDUSTRIAL APPLICABILITY

The present disclosure is applicable to a measurement device and a measurement method which adjust the dimensions of the measured object.

What is claimed is:

1. A measurement device that calculates a size of an outer shape of an object that has a plurality of planes, the measurement device comprising:
   an user interface that receives an operation of a user;
   an camera that acquires depth information indicating a depth image of the object and color information indicating a color image of the object;
   a controller that calculates first dimension indicating a width, a depth, and a height of the object based on at least one of the depth information and the color information; and
   a display that displays a frame image showing a contour shape of the object to be superimposed on the color image, the contour shape being based on the first dimension,
   wherein the user interface receives a selection of an adjustment target plane and an input of a change amount of the adjustment target plane by the user, and
   the controller calculates, based on the first dimension and the change amount, second dimension indicating a width, a depth, and a height of the object when the adjustment target plane is moved in a normal direction of the adjustment target plane based on the change amount, and changes the frame image displayed on the display to show a contour shape of the object, the contour shape being based on the second dimension.

2. The measurement device according to claim 1, wherein the user interface is a touch panel, and
   the controller calculates center coordinates of each of the plurality of planes in the frame image in the selection of the adjustment target plane, and selects, as the adjustment target plane, a plane in which a distance between coordinates of a position of the touch panel, the position being touched by the user, and the center coordinates is shortest.

3. The measurement device according to claim 1, wherein the user interface is a touch panel,
   on at least one of the plurality of planes, the display displays an image with a predetermined shape associated with the at least one of the plurality of planes, and
   in the selection of the adjustment target plane, when coordinates of the position of the touch panel, the position being touched by the user, are within a range of the image with the predetermined shape, the controller selects, as the adjustment target plane, a plane associated with the image with the predetermined shape.

4. The measurement device according to claim 1, wherein the change amount of the adjustment target plane is input by a slide operation or a numeric input to the user interface.

5. The measurement device according to claim 1, wherein
   the change amount input by the user corresponds to a number of pixels, and
   the controller converts the number of pixels into a length and calculates the second dimension.

6. The measurement device according to claim 1, wherein the acquisition unit includes a depth camera that photographs the object and generates the depth information, and a visible light camera that photographs the object and generates the color information.

7. A measurement method of calculating a size of an outer shape of an object that has a plurality of planes, the measurement method comprising:
   a step of acquiring depth information indicating a depth image of the object and color information indicating a color image of the object;
   a step of calculating first dimension indicating a width, a depth, and a height of the object based on at least one of the depth information and the color information;
   a step of displaying on a display a frame image showing a contour shape of the object to be superimposed on the color image, the contour shape being based on the first dimension;
   a step of receiving a selection of an adjustment target plane and a input of a change amount of the adjustment target plane by a user;
   a step of calculating, based on the first dimension and the change amount, second dimension indicating a width, a depth, and a height of the object when the adjustment target plane is moved in a normal direction of the adjustment target plane based on the change amount; and
   a step of changing the frame image displayed on the display to show a contour shape of the object, the contour shape being based on the second dimension.

* * * * *